Patented Apr. 22, 1947

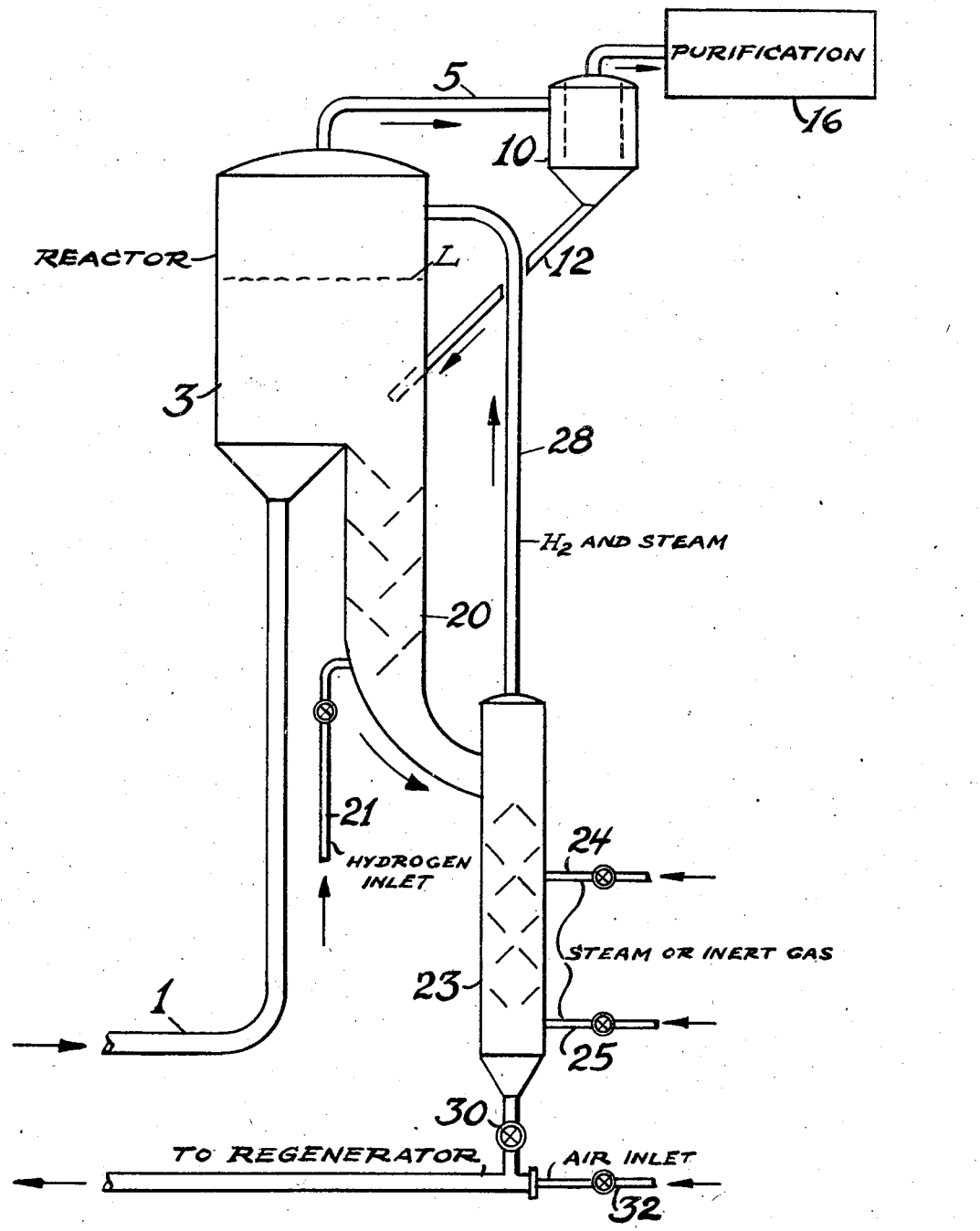

2,419,323

UNITED STATES PATENT OFFICE 2,419,323

CONVERSION OF HYDROCARBON OILS

Richard N. Meinert, Westfield, and Philetus H. Holt, 2nd, Summit, N. J., assignors to Standard Oil Development Company, a corporation of Delaware Application December 7, 1944, Serial No. 567,064

3 Claims. (Cl. 196—52)

The novel features of our invention are fully disclosed in the ensuing specification and claims when read in connection with the accompanying drawing.

The catalytic reforming of naphthas in the presence of a catalyst to produce aromatics or products containing aromatics is a matter of record. Insofar as we are aware, the commercial process of catalytic reforming has been accomplished only in the so-called stationary bed type of operation where the vaporized reactants and hydrogen are forced through a bed or beds of stationary catalyst material. Since the operation results in the formation of carbonaceous deposits on the catalyst, it is necessary periodically to interrupt the productive phase of the reaction to remove the carbonaceous contaminants usually, by combustion, to restore the activity of the catalyst which is impaired by the presence of said carbonaceous deposits. Hence processes of this type are intermittent with respect to a single reactor.

It is an object of our invention to provide means for carrying out the catalytic reforming of hydrocarbon oils in the presence of added hydrogen continuously.

Another object of our invention is to provide means for stripping catalyst of adsorbed and/or occluded hydrocarbons.

Another object of our invention is to strip or replace the volatile hydrocarbons from fouled powdered catalyst issuing from a reaction zone with hydrogen and thereafter to strip the hydrogen from the catalyst with steam.

Other and further objects of our invention will appear from the following more detailed description.

In the accompanying drawing we have illustrated diagrammatically an apparatus in which a preferred modification of our invention may be carried into effect.

We shall now set forth a specific embodiment of our invention and before that, we wish to point out that our process is one in which the catalyst preferably employed is a sixth group oxide carried on zinc spinel ($ZnAl_2O_4$) and further, that our process is not only adopted to convert naphthenes into aromatics but to convert normal paraffins also in aromatics. Hence in making a high octane number gasoline the feed need not contain a preponderance of naphthenes, nor need it be a virgin naphtha. It may be a cracked naphtha and may contain olefins and a preponderance of paraffins.

Referring in detail in the drawing 1 represents a naphtha feed line into which there is fed to a reaction zone 3 a suspension of powdered catalyst in naphtha vapors and hydrogen say a 115°–400° F. naphtha fraction heated to a temperature of from about 900°–950° F. For the sake of simplicity we have not shown the preheating of the naphtha nor the dispersion or suspension of the catalyst therein for methods for accomplishing this result are well known in the prior art. Neither have we shown in the drawing the method of regenerating fouled catalyst and returning it to the reaction zone for this also is known in the prior art. The suspension of catalyst in the naphtha feed enters the reaction zone 3 where the quantity of catalyst and the velocity of the vapors, passing upwardly through the reaction zone are controlled so as to provide within the reaction zone a dense phase suspension of catalyst in reaction vapors and added hydrogen. The velocity of the gases in the reaction zone is controlled within the limits of ½ to 5 ft. per second, preferably 1–2 ft. per second, to provide the dense phase fluidized mass of catalyst in gases and/or vapors previously mentioned. Also, the quantity of catalyst fed to the reaction zone is controlled within the limits of 1 to 30 lbs. of catalyst per lb. of naphtha fed to the said reaction zone. The dense phase suspension thus formed will have an upper level at L, above which the density of the catalyst in the gases and/or vapors drops sharply so that as reaction products are withdrawn from the reaction zone through line 5 they are greatly depleted in catalyst to the extent that the density may be of the order of 0.025 lb. per cubic foot, whereas the density of the catalyst below L in the reaction zone may be 15–25 lbs. per cubic foot.

The reaction products and hydrogen in line 5 are preferably passed through one or more solid-gas contacting devices such as centrifugal separator 10 to remove further quantities of catalyst which is then recycled to the reaction zone thru line 12, while the overhead vapor product passes to a purification system, indicated by 16, where the product may be separated from hydrogen which hydrogen is recycled, and then the product is fractionally distilled and/or solvent treated to recover aviation gasoline and/or purified aromatic hydrocarbons. Here again, since the purification and recovery of desired products does not go to the heart of our invention, we have omitted details of such purification since they are known to those familiar with this art.

We withdraw catalyst continuously from the reactor 3 through a draw-off pipe 20. This catalyst will contain adsorbed and/or occluded volatile hydrocarbons and to displace these materials from the catalyst we feed through line 21 into 20 a quantity of hydrogen which flows upwardly and countercurrently against downwardly flowing catalyst and serves to displace downwardly flowing hydrocarbons. The hydrogen and the removed volatile hydrocarbons pass from pipe 20 into reactor 3. The amount of hydrogen used to strip the catalyst will depend on the ratio of oil to catalyst by weight in feed line 1. The amount of hydrogen used may vary between 50 and 500 cu. ft. (measured at standard conditions) per 1000 lbs. of catalyst withdrawn thru pipe 20. Since the weight ratio of catalyst to oil fed to the reactor may vary between 1/1 and 30/1, more hydrogen will be injected into line 20 when high catalyst oil ratios are employed. Some hydrogen should always be mixed with the feed in line 1 to direct the reaction in line 1, and the total amount of hydrogen added in line 1 and in pipe 20 may vary between 1000 and 4000 cu. ft. per barrel of oil fed.

We discharge catalyst from pipe 20 into a steam stripping pipe or column 23 in which we treat the catalyst with steam to dislodge occluded hydrogen. The steam enters the pipe 23 via lines 24 and 25 and after passing through the downflowing catalyst, issues through line 26 and is then discharged into the reactor 3 at a point above dense phase level L.

The purged catalyst finally is withdrawn from the bottom of pipe 23 and discharges into a pipe 30 where it is admixed with air and conveyed to a regenerator (not shown) wherein the contaminants on the catalyst are burned off and the same returned to the reaction zone in substantially uncooled condition via line 1.

The catalyst itself is composed preferably of 8 to 10 weight per cent of $MoO_3$ carried on 90 to 92 weight per cent of zinc spinel. $CrO_3$ may be substituted for the $MoO_3$.

In the reactor the following conditions prevail:

|  | Good results | Preferred |
| --- | --- | --- |
| Temperature | 875 to 1000° F | same. |
| Pressure | 0 to 400 lbs./sq. in | 15 to 50 lbs./sq. in. |
| Cat/oil ratio in reactor. | 1/1 to 30/1 weight ratio | same. |
| Cat. Particle Size | 100-400 Mesh | 200-400 mesh. |

The real gist of our invention has to do with stripping the catalyst of hydrogen. In a fluid catalyst reforming process such as we have described above, the catalyst exiting from reactor 3 entrains with it normally gaseous hydrocarbons and other adsorbed hydrocarbon materials of a volatile nature. These hydrocarbons must be removed from the stripping zone before they are delivered to the regeneration zone, for best results. The stripping gas may be steam, hydrogen or inert gases. The use of steam or inert gas has several disadvantages for these gases passing through the reactor act as an undesirable diluent in the reaction zone. The steam may have a temporary adverse effect on the catalyst and inert gas such as flue gas, increases required compressor capacity following the fluid catalyst unit, and dilutes the gas formed in the process.

The use of hydrogen, on the other hand, as a stripping gas is beneficial in the catalytic reforming process, since its presence within the reactor reduces coke formation and improves gasoline yields. It is important in our process not to permit the catalyst in line 30 where it is admixed with air and passes to the regenerator, to contain appreciable quantities of hydrogen, for of course hydrogen is a highly combustible material and therefore undesirable in the regeneration zone. Hence we provide a further stripping in pipe 23 to remove the hydrogen from the catalyst.

Numerous modifications of our invention coming within the scope may be made without departing from the spirit thereof.

What we claim is:

1. In the continuous hydroforming of naphthas performed in a reaction zone where a catalyst consisting essentially of one of the class of chromium oxide and molybdenum oxide on zinc spinel, which catalyst is in powdered form and is maintained in contact with the vapors of reactants by causing it to be suspended in the reactants in the form of a dense, fluidized, turbulent mass maintained under reforming conditions of temperature and contact time, the pressure in the reaction zone being from 15-50 pounds per square inch gauge, the improvement which comprises continuously withdrawing a quantity of catalyst from the reaction zone for purposes of regeneration and prior to such regeneration removing volatile hydrocarbons therefrom in a stripping zone by causing the catalyst to flow countercurrently against a current of gas containing hydrogen in said stripping zone, withdrawing catalyst from the stripping zone, discharging it into a second stripping zone, treating the said catalyst with steam in the said second stripping zone to dislodge hydrogen whereby the catalyst is prepared for regeneration.

2. The method set forth in claim 1 in which the catalyst consists essentially of molybdenum oxide on zinc spinel.

3. The method set forth in claim 1 in which the catalyst consists essentially of chromium oxide on zinc spinel.

RICHARD N. MEINERT.
PHILETUS H. HOLT, 2ND.

REFERENCES CITED

The following references are of record in the file of this patent:

UNITED STATES PATENTS

| Number | Name | Date |
| --- | --- | --- |
| 2,257,486 | Carpenter | Oct. 21, 1941 |
| 2,302,209 | Goddin | Nov. 17, 1942 |
| 2,357,271 | Taylor et al. | Aug. 29, 1944 |
| 2,366,372 | Voorhees | Jan. 2, 1945 |
| 2,320,147 | Layng et al. | May 25, 1943 |
| 2,344,330 | Sturgeon | Mar. 14, 1944 |